US008763230B2

(12) United States Patent
Sun et al.

(10) Patent No.: US 8,763,230 B2
(45) Date of Patent: Jul. 1, 2014

(54) MANUFACTURING METHOD FOR MACHINE TOOL

(75) Inventors: Chin-Chu Sun, Hsinchu (TW);
Cheng-Yu Chen, Hsinchu (TW);
Wan-Kun Chang, Hsinchu (TW);
Yung-Ming Kao, Hsinchu (TW);
Shih-Chang Liang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 495 days.

(21) Appl. No.: 12/977,487

(22) Filed: Dec. 23, 2010

(65) Prior Publication Data

US 2012/0117787 A1 May 17, 2012

(30) Foreign Application Priority Data

Nov. 12, 2010 (TW) .............................. 99138942 A

(51) Int. Cl.
*B21D 39/03* (2006.01)
*G05B 19/4155* (2006.01)

(52) U.S. Cl.
CPC .. *G05B 19/4155* (2013.01); *G05B 2219/36092* (2013.01); *G05B 2219/36091* (2013.01)
USPC ................................ 29/428; 29/429; 29/430

(58) Field of Classification Search
USPC .......................................... 29/428, 429, 430
See application file for complete search history.

(56) References Cited

U.S. PATENT DOCUMENTS

| | | | |
|---|---|---|---|
| 5,595,463 A | 1/1997 | Takegahara et al. | |
| 5,917,300 A * | 6/1999 | Tanquary et al. | 318/575 |
| 6,357,994 B1 * | 3/2002 | St. Onge | 414/738 |
| 6,397,122 B1 * | 5/2002 | Lindstrom et al. | 700/145 |
| 6,711,804 B2 * | 3/2004 | Eicher | 29/563 |
| 7,086,518 B1 * | 8/2006 | Hranica et al. | 198/341.03 |
| 7,241,200 B2 * | 7/2007 | Kalanovic | 451/5 |
| 7,395,122 B2 * | 7/2008 | Kreidler et al. | 700/18 |
| 7,620,473 B2 | 11/2009 | Kamiya et al. | |
| 2003/0014149 A1 * | 1/2003 | Kreidler et al. | 700/169 |
| 2005/0193537 A1 * | 9/2005 | Berner et al. | 29/25 |
| 2006/0217037 A1 * | 9/2006 | Kalanovic | 451/5 |
| 2009/0249606 A1 * | 10/2009 | Diez et al. | 29/428 |
| 2010/0324720 A1 * | 12/2010 | Zhan et al. | 700/162 |

FOREIGN PATENT DOCUMENTS

| | | |
|---|---|---|
| JP | 9230920 A | 9/1997 |
| JP | 2002189510 A | 7/2002 |

(Continued)

OTHER PUBLICATIONS

Taiwan Patent Office, Office Action, Mar. 12, 2013, Taiwan.

*Primary Examiner* — Carl Arbes
(74) *Attorney, Agent, or Firm* — Rabin & Berdo, P.C.

(57) ABSTRACT

The present invention provides a manufacturing method for a machine tool having a human-machine interface and a program with predetermined manufacturing conditions. The manufacturing method includes (1) setting, via the human-machine interface, one or more specific manufacturing areas of the workpiece and specific conditions for the specific manufacturing areas; (2) determining by the controller whether the manufacturing of the workpiece is performed at one of the specific manufacturing areas; (3) performing the manufacturing of the workpiece under one of the specific conditions corresponding to the one of the specific manufacturing areas via the controller and monitoring continuously the manufacturing status of the machine tool if the manufacturing of the workpiece is performed at one of the specific manufacturing areas; and (4) performing the manufacturing of the workpiece according to the predetermined manufacturing conditions via the controller if the manufacturing of the workpiece is not performed at the specific manufacturing areas.

13 Claims, 4 Drawing Sheets

(56) References Cited

FOREIGN PATENT DOCUMENTS

| JP | 2009181330 | A | 8/2009 |
| TW | 500649 | B | 9/2002 |
| TW | 200728947 | A | 8/2007 |
| TW | I325099 | A | 2/2008 |

* cited by examiner

MANUFACTURING METHOD FOR MACHINE TOOL

BACKGROUND

1. Field of the Invention

The present invention relates to manufacturing methods for a machine tool, and more particularly, to a manufacturing method for setting a specific manufacturing area and using a specific manufacturing condition for a workpiece.

2. Description of Related Art

Computer numerical control (CNC) machine tools are programmable and precise for manufacturing. Users modify CNC programs according to the procedure, path or precision that is needed for manufacturing a workpiece. The manufacturing shape of the workpiece is designed via single-column commands of the CNC program. However, once the shape of the workpiece is more complicated, the single-column input of the CNC program takes more time. Therefore, CAD/CAM software is usually used for producing the manufacturing program, and the workpiece is thus processed by the machine tool.

FIG. 1A is a flow chart showing a CNC program produced from CAD/CAM software in the prior art. In Step S11, the shape of the workpiece to be processed is designed by CAD software, and then a CNC program is produced by CAM software according to the shape by CAM software. In Step S12, the workpiece is processed by a machine tool according to the CNC program. In Step S13, a user detects and measures whether tolerance and procession of the processed workpiece meet the standard, and the procedure returns to Step S12 for adjusting the processing conditions such as feeding rate and the rotation rate of the main shaft or returns to Step S11 for readjusting the previous designed shape, precision and processing by CAD/CAM software based on the error result. The above steps are repeated until the workpiece meets the designed tolerance and precision.

FIG. 1B shows the workpiece 1, which has been processed by the CC program produced from the CAD/CAM software. The manufacturing conditions are the manufacturing rate being 1500 (mm/min), i.e. cutting 1500 mm per minute, rough manufacturing time being 17 minutes and 56 seconds and precise manufacturing time being 31 minutes and 5 seconds. The total manufacturing time is 49 minutes and 1 second. The workpiece 1 has a burr 11 at the edge. Thus, the workpiece 1 may be further processed by using the procedure shown in FIG. 1A. However, the CAD/CAM software is expensive, and the cost must be increased to buy CAD/CAM software and hire operators.

When there is no CAD/CAM software, engineers need to find out the program code, which needs to be modified, from thousands lines of the manufacturing program in order to correct the defect of the workpiece 1. This, however, takes much time and easily results in errors. On the other hand, the current machine tools have buttons for controlling feeding and the rotation speed of the main shaft, and thus users adjust the feeding and the rotation speed of the main shaft via the buttons so as to improve precision and eliminate burr of the workpiece 1. However, such adjustment cannot only focus on the defect, and therefore when the defect is overcome to meet the standard, other areas are over standard.

Hence, there is a need to develop a method for performing manufacturing and correction on a defect without CAD/CAM software to save time and cost of amending manufacturing conditions.

SUMMARY

The present invention provides a manufacturing method for a machine tool. The machine tool has a controller for providing a human-machine interface and installs a program having a predetermined manufacturing condition for controlling the machine tool to perform a manufacturing of a workpiece according to the predetermined manufacturing condition and monitoring a manufacturing status of the machine tool. The manufacturing method includes the steps of (1) setting, via the human-machine interface, one or more specific manufacturing areas of the workpiece and specific conditions for the specific manufacturing areas; (2) determining by the controller whether the manufacturing of the workpiece is performed at one of the specific manufacturing areas; (3) performing the manufacturing of the workpiece under one of the specific conditions corresponding to the one of the specific manufacturing areas via the controller and monitoring continuously the manufacturing status of the machine tool if the manufacturing of the workpiece is performed at one of the specific manufacturing areas; and (4) performing the manufacturing of the workpiece according to the predetermined manufacturing conditions via the controller if the manufacturing of the workpiece is not performed at the specific manufacturing areas.

In the present invention, the manufacturing method further includes the step of (5) determining by the controller whether the program is completely executed; ending the program if the program is completely executed, and returning to the step (2) if the program is not completely executed.

In the step (1) of the manufacturing method, a proposed workpiece shape or an actual workpiece shape upon the manufacturing of the workpiece is pre-shown by the controller via the human-machine interface for a user to design the specific manufacturing areas according to the proposed workpiece shape or the an actual workpiece shape.

In the step (1) of the manufacturing method, the coordinate is input via the human-machine interface for setting the specific manufacturing areas, or the specific manufacturing areas are indicated with an cursor via the human-machine interface, and then coordinates of the specific manufacturing areas are calculated by the controller.

Accordingly, in the manufacturing method for a machine tool of the present invention, one or more specific manufacturing areas and corresponding specific conditions are set via a human-machine interface, and the specific condition is used in response to the specific manufacturing area while manufacturing a workpiece, so as to simplify the conventional method that the shape and precision of the workpiece are adjusted by CAD/CAM software or the feeding rate, the rotation rate of the main shaft and the manufacturing program are adjusted by buttons. Hence, the manufacturing method for a machine tool of the present invention improves the quality of workpiece and decreases the production cost.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Figure 2:
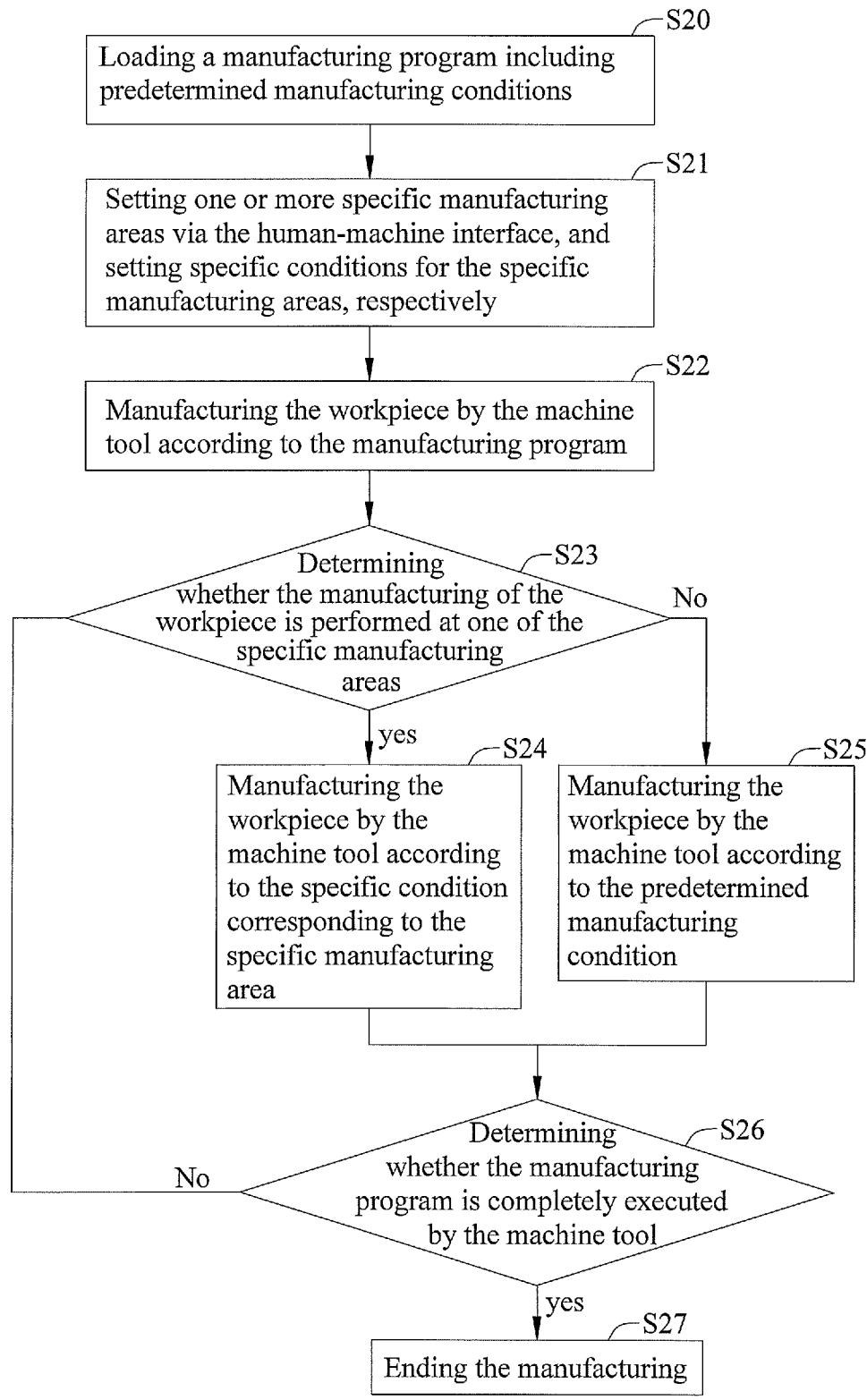
FIG. 2 is a flow chart showing the manufacturing method for a machine tool according to the present invention.

FIG. 2 is a flow chart showing the manufacturing method for a machine tool according to the present invention. Specifically, the machine tool has a controller for controlling the movement or rotation of a main shaft, which is loaded with cutting means, so as to control the moving path of the cutting means.

In the step S20, the manufacturing program is loaded by the controller, wherein the manufacturing program includes predetermined conditions, and the controller instructs each shaft to move for manufacturing a workpiece according to the commands of the program. Specifically, the program loaded by the controller includes the predetermined conditions, such as the manufacturing path, the rotation rate of the main shaft and feeding rate, of the machine tool, and the predetermined conditions affect all areas of the workpiece. Proceed to the step S21.

In the step S21, a user sets one or more specific manufacturing areas via the human-machine interface, and sets specific conditions respectively corresponding to the specific manufacturing areas. Specifically, a proposed shape of the workpiece upon the manufacturing is pre-shown by the controller via the human-machine interface, or an actual shape of the workpiece upon the manufacturing is shown by the controller via the human-machine interface. Thus, the user can see the 2D/3D mimic diagram on the human-machine interface, and directly input coordinates of the specific manufacturing area of the workpiece to be manufactured or indicate the specific manufacturing area with the cursor for the controller to calculate the coordinates of the specific manufacturing areas. In addition, the coordinates of the specific manufacturing areas and the specific conditions may be stored in a storage device of the controller.

In the step S22, the workpiece is manufactured by the machine tool via the controller according to the manufacturing program In the step S23, it is determined whether the manufacturing of the workpiece is performed at one of the specific manufacturing areas by the machine tool. In other words, it is determined whether the manufacturing of the workpiece is performed into the specific manufacturing areas by the cutting means of the main shaft. If the manufacturing of the workpiece is performed at one of the specific manufacturing areas by the machine tool, the manufacturing method proceeds to the step S24. If the manufacturing of the workpiece is not performed at one of the specific manufacturing areas by the machine tool, the manufacturing method proceeds to the step S25.

In the step S24, if the manufacturing of the workpiece is performed at one of the specific manufacturing areas by the machine tool, the controller instructs the machine tool to manufacture the workpiece according to the specific condition corresponding to such specific manufacturing area. Specifically, the cutting means of the machine tool still moves in the manufacturing path according to the original command of the program; however, such specific manufacturing area needs the manufacturing condition different from other manufacturing areas, so that the specific condition corresponding to such manufacturing area is used by the controller for manufacturing such specific manufacturing area of the workpiece.

In the step S25, if the manufacturing of the workpiece is performed out of the specific manufacturing areas, the controller instructs the machine tool to manufacture the workpiece according to the predetermined conditions.

In the step S26, it is determined by the controller whether the manufacturing program is completely executed by the machine tool. In other words, it is determined whether the program is completed read and executed by the machine tool. If the program is completed read and executed by the machine tool, the manufacturing method proceeds to the step S27 for ending the manufacturing method. If the program is not completed read and executed by the machine tool, the manufacturing method returns to the step S23.

After finishing the manufacturing of the workpiece from the step S20 to the step S27, it may be performed to evaluate the appearance, outline, cutting traces, smoothness, manufacturing time and so on of the workpiece, so as to determine whether the manufacturing method returns back to the step S21 for setting the specific manufacturing areas and the specific conditions.

The specific conditions include the feeding rate, the rotation rate of the main shaft, precision level, smoothening property, precise positioning, system gain values, curve mimic property, speed changing type, cutting depth and forward feedback compensation mechanism. The values of the specific conditions may be proportional to the values in the manufacturing program. For example, the feeding amount in the specific conditions may be 40% of the original feeding amount. Alternatively, the specific condition may be a specified value. For example, the cutting feeding is specified as F1200 (mm/min), i.e. cutting 1200 mm per minute.

Further, the specific conditions for the specific manufacturing areas include the feeding rate, the feeding speed, the rotation rate of the main shaft, precision level or smoothening property. The above specific conditions may be modified by the user according to the change of the above specific manufacturing areas to obtain better manufacturing precision or other better achievement.

Figure 3:
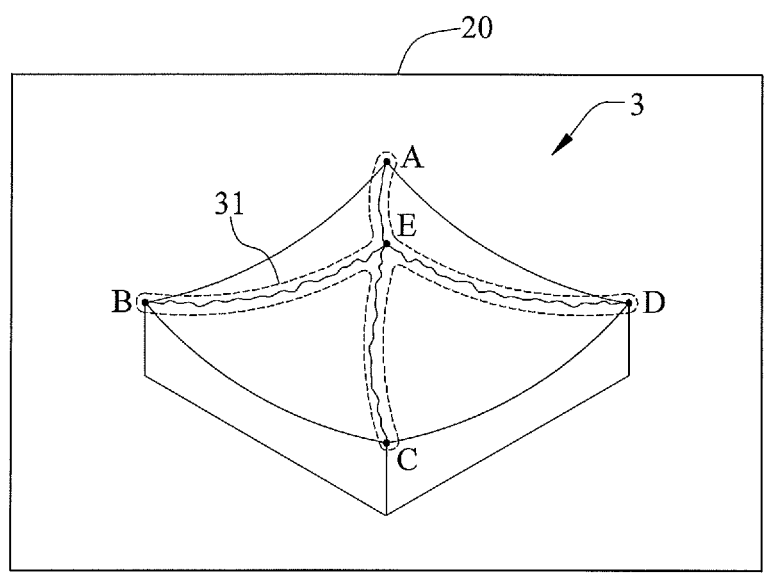
FIG. 3 is a schematic view showing the manufacturing shape of the workpiece and its specific manufacturing area shown in the human-machine interface according to the present invention.

FIG. 3 is the schematic view of the embodiment according to the present invention. As shown in FIG. 3, a proposed shape 3 of the workpiece is pre-shown by the controller via the human-machine interface 20 according the manufacturing program.

If the manufacturing method is performed according to the manufacturing program, the edges (curves AE, BE, CE and DE) of the workpiece would be burrs. In the manufacturing method of the present invention, specific manufacturing areas are set on the proposed shape 3 of the workpiece by using a cursor to indicate a specific manufacturing area 31, for example. The edges (curves AE, BE, CE and DE) of the workpiece are enclosed by the manufacturing area 31, and then the specific conditions for the manufacturing area are set. In the embodiment shown in FIG. 3, the manufacturing rate is F1500 (mm/min), rough manufacturing time is 22 minutes, and precise manufacturing time is 41 minutes and 3 seconds. Total manufacturing time is 63 minutes and 3 second. When the manufacturing of the workpiece is performed at the specific manufacturing area of the workpiece, the specific condition rather than the predetermined manufacturing condition in the program is used. Therefore, the total manufacturing time may be a little longer than that of the conventional method, but the quality of the manufactured workpiece in the present invention is significantly improved. In addition, when the manufacturing method is performed at the portion where a burr easily occurs, such as the curves AE, BE, CE and DE, the specific condition, a slower manufacturing speed, is used by the controller for manufacturing the workpiece. Particularly, an even slower manufacturing speed is used at the apex E, such that the workpiece has better precision and tolerance. A faster manufacturing speed is used at the central portion of the curved surfaces ABE, BCE, CDE and ADE.

Figure 1A:
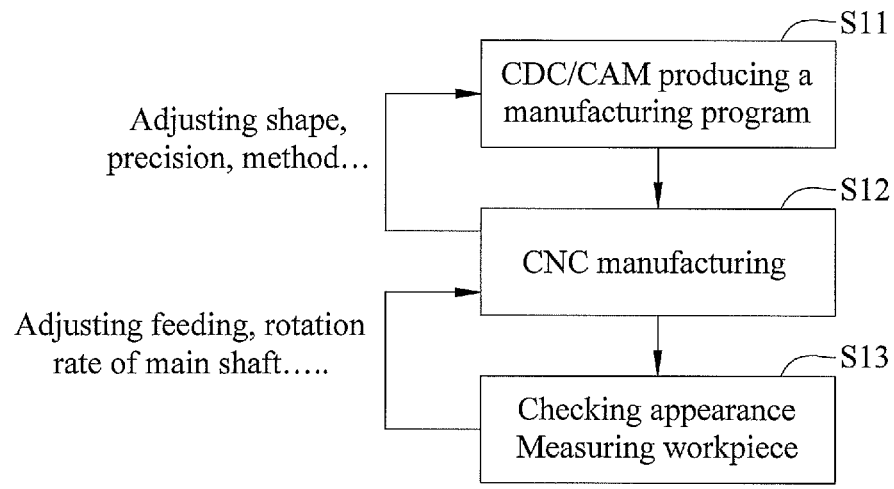
FIG. 1A is a flow chart showing a manufacturing method for a CNC machine tool in the prior art.
Figure 1B:
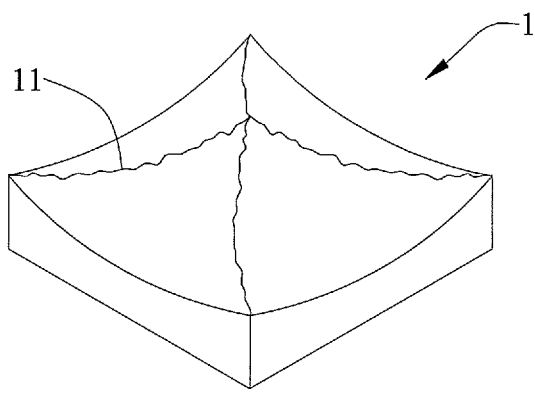
FIG. 1B is a schematic view showing a workpiece manufactured by the manufacturing method for a CNC machine tool in the prior art.

Hence, in comparison with the workpiece shown in FIG. 1B, the workpiece in FIG. 3 is manufactured by the method shown in FIG. 2, wherein the specific condition is used at the portion where a burr easily occurs, so as to decrease the time and cost. Furthermore, the manufacturing method can be performed at a single area in the present invention.

Moreover, the coordinates of the specific manufacturing area which needs to be manufactured may be directly input by the user according to the shape of the workpiece shown in FIG. 3.

Figure 4:
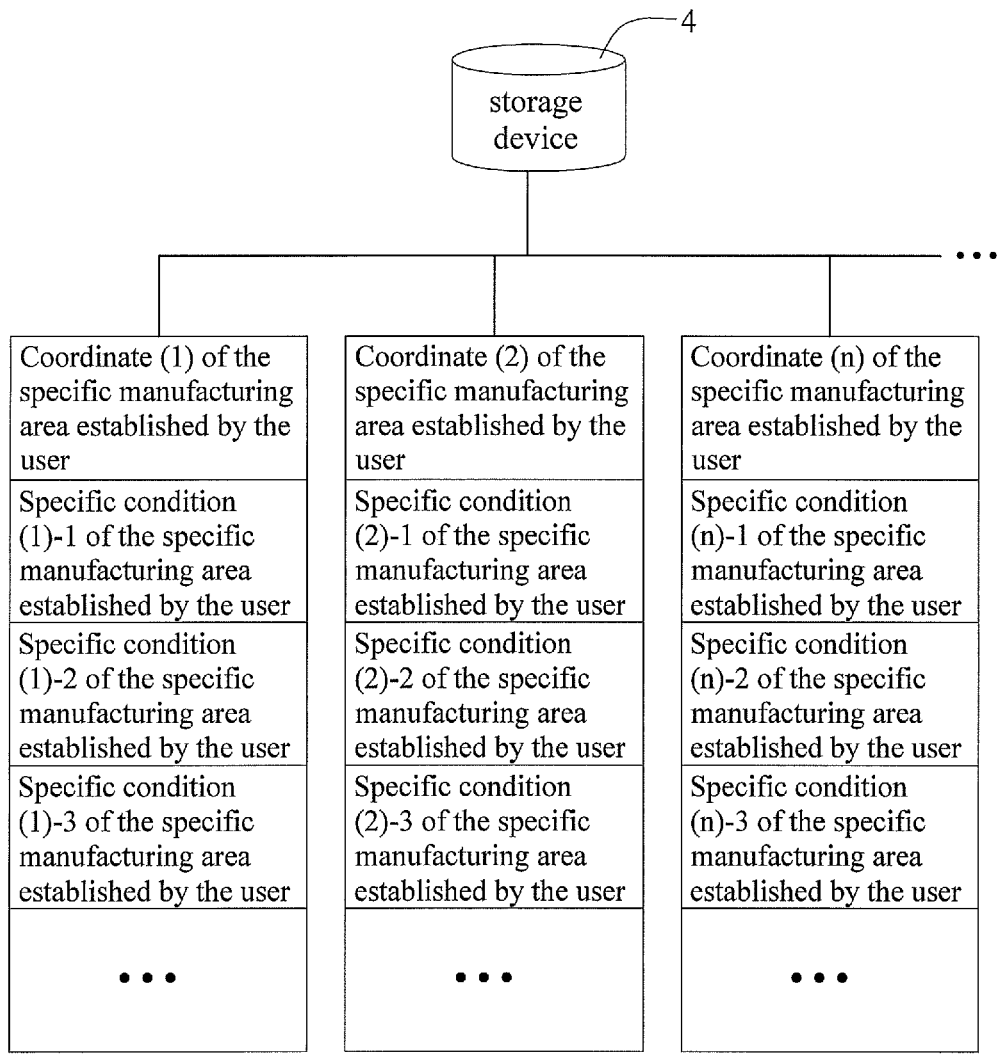
FIG. 4 is a schematic view showing the storage device for storing the specific manufacturing areas and the specific conditions according to the present invention.

FIG. 4 is a schematic view showing a storage device 4 for storing coordinates of specific manufacturing areas and specific conditions. The storage device 4 is disposed in the controller of the machine tool or externally connected to the controller for storing at least n coordinates of the specific manufacturing areas and the specific conditions such as the feeding rate. As shown in FIG. 4, the storage device 4 is used for storing values of the coordinates and specific conditions of the specific manufacturing areas. In addition, the user may establish n specific manufacturing areas including the coordinate (1) of the specific manufacturing area, the coordinate (2) of the specific manufacturing area, and the coordinate (n) of the specific manufacturing area as shown in FIG. 4. As shown in FIG. 4, each specific manufacturing area has a plurality of conditions, wherein the condition (1)-1, condition (1)-2 and condition (1)-3 may be set in the coordinate (1) of the specific manufacturing area for representing different manufacturing conditions such as feeding rate, rotation rate of the main shaft, precision level, speed changing type and cutting depth. While the manufacturing method for the machine tool is performed at one specific manufacturing area, the specific condition for such specific manufacturing area is used in the manufacturing method.

Accordingly, in the manufacturing method of the present invention, one or more specific manufacturing areas and the specific conditions for the specific manufacturing areas are set via the human-machine interface, the specific conditions rather than the predetermined manufacturing conditions are used at the specific manufacturing areas by the machine tool, so as to reduce the time and cost for setting manufacturing conditions and further to obtain better precision and tolerance of the workpiece.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. A manufacturing method for a machine tool, which has a controller for providing a human-machine interface and installs a program having a predetermined manufacturing condition for controlling the machine tool to perform a manufacturing of a workpiece according to the predetermined manufacturing condition and monitoring a manufacturing status of the machine tool, the manufacturing method comprising the steps of:

(1) setting, via the human-machine interface, one or more specific manufacturing areas of the workpiece and specific conditions for the specific manufacturing areas;

(2) determining by the controller whether the manufacturing of the workpiece is performed at one of the specific manufacturing areas;

(3) performing the manufacturing of the workpiece under one of the specific conditions corresponding to the one of the specific manufacturing areas via the controller and monitoring continuously the manufacturing status of the machine tool if the manufacturing of the workpiece is performed at one of the specific manufacturing areas; and (4) performing the manufacturing of the workpiece according to the predetermined manufacturing conditions via the controller if the manufacturing of the workpiece is not performed at the specific manufacturing areas;

wherein in step (2), the manufacturing status of the machine tool is monitored via real-time monitoring a coordinate of a cutting means of the machine tool by the controller, in which while the coordinate of the cutting means is within the specific manufacturing areas, it is determined that the manufacturing of the workpiece is performed at the specific manufacturing areas, and while the coordinate of the cutting means is not within the specific manufacturing areas, it is determined that the manufacturing of the workpiece is not performed at the specific manufacturing areas.

2. The manufacturing method of claim 1, further comprising the step of determining by the controller whether the program is completely executed; ending the program if the program is completely executed, and returning to the step (2) if the program is not completely executed.

3. The manufacturing method of claim 1, wherein in step (1), a proposed workpiece shape upon the manufacturing of the workpiece is pre-shown by the controller via the human-machine interface for a user to design the specific manufacturing areas according to the proposed workpiece shape.

4. The manufacturing method of claim 3, wherein step (1) comprises inputting coordinates via the human-machine interface for setting the specific manufacturing areas.

5. The manufacturing method of claim 3, wherein step (1) comprises indicating the specific manufacturing areas with a cursor via the human-machine interface, and then calculating coordinates of the specific manufacturing areas by the controller.

6. The manufacturing method of claim 1, wherein in step (1), an actual workpiece shape upon the manufacturing of the workpiece is shown by the controller via the human-machine interface for a user to design the specific manufacturing areas according to the actual workpiece shape.

7. The manufacturing method of claim 6, wherein step (1) comprises indicating the specific manufacturing areas with a cursor via the human-machine interface, and then calculating coordinates of the specific manufacturing areas by the controller.

8. The manufacturing method of claim 6, wherein step (1) further comprises inputting the coordinates via the human-machine interface for setting the specific manufacturing areas.

9. The manufacturing method of claim 8, wherein step (1) further comprise setting the specific conditions respectively corresponding to the coordinates of the specific manufacturing areas, and when the manufacturing of the workpience is performed at one of the cursor of the specific manufacturing areas, accessing corresponding conditions from the specific conditions for performing the manufacturing of the workpiece according the corresponding conditions.

10. The manufacturing method of claim 1, wherein step (1) further comprises storing coordinates of the specific manufacturing areas and the specific conditions in a storage device of the controller.

11. The manufacturing method of claim 1, wherein values of the specific conditions are specified percentages of values of the predetermined manufacturing condition of the program.

12. The manufacturing method of claim 1, wherein values of the specific conditions are specified values.

13. The manufacturing method of claim 1, wherein the specific conditions comprises a feeding rate, a rotation rate of a main shaft, a precision grade, a smoothening function, a precision positioning, a system gain value, a curve fitting function, a speed change function, a cutting depth and a forward feedback compensation mechanism.

* * * * *